United States Patent [19]

Maggioni

[11] Patent Number: 5,353,917
[45] Date of Patent: * Oct. 11, 1994

[54] MULTIPLE-CHANNEL VIBRATING FEEDING TABLE

[75] Inventor: Roberto Maggioni, Largo Mozart 7, 20064 Gorgonzola (Province of Milan), Italy

[73] Assignee: Roberto Maggioni, Gorgonzola, Italy

[*] Notice: The portion of the term of this patent subsequent to Mar. 2, 2010 has been disclaimed.

[21] Appl. No.: 91,135

[22] Filed: Jul. 9, 1993

Related U.S. Application Data

[63] Continuation of Ser. No. 911,573, Jul. 10, 1992, Pat. No. 5,190,139.

[30] Foreign Application Priority Data

Jul. 23, 1991 [IT] Italy ............................ MI91A002032

[51] Int. Cl.$^5$ ............................................ B65G 43/10
[52] U.S. Cl. .................................... 198/570; 198/575; 198/766
[58] Field of Search ............... 198/570, 575, 758, 766, 198/609

[56] References Cited

U.S. PATENT DOCUMENTS

| | | | |
|---|---|---|---|
| 2,872,024 | 2/1959 | Serenetz | 198/570 |
| 4,462,522 | 7/1984 | Fluck | 198/570 |
| 4,744,458 | 5/1988 | Fluck et al. | 198/570 |

FOREIGN PATENT DOCUMENTS

| | | |
|---|---|---|
| 1781164 | 8/1972 | Fed. Rep. of Germany . |
| 611928 | 10/1926 | France . |
| 2415489 | 8/1979 | France . |

*Primary Examiner*—Cheryl L. Gastineau
*Attorney, Agent, or Firm*—Guido Modiano; Albert Josif; Daniel O'Byrne

[57] ABSTRACT

The multiple-channel vibrating feeding table includes a table provided with a plurality of mutually adjacent troughs which define the channels for conveying loose parts, motor element for vibrating the table, and elements for connecting each of the troughs to the motor elements, the connecting elements being individually actuatable in order to vibrate only selected trough or troughs.

8 Claims, 3 Drawing Sheets

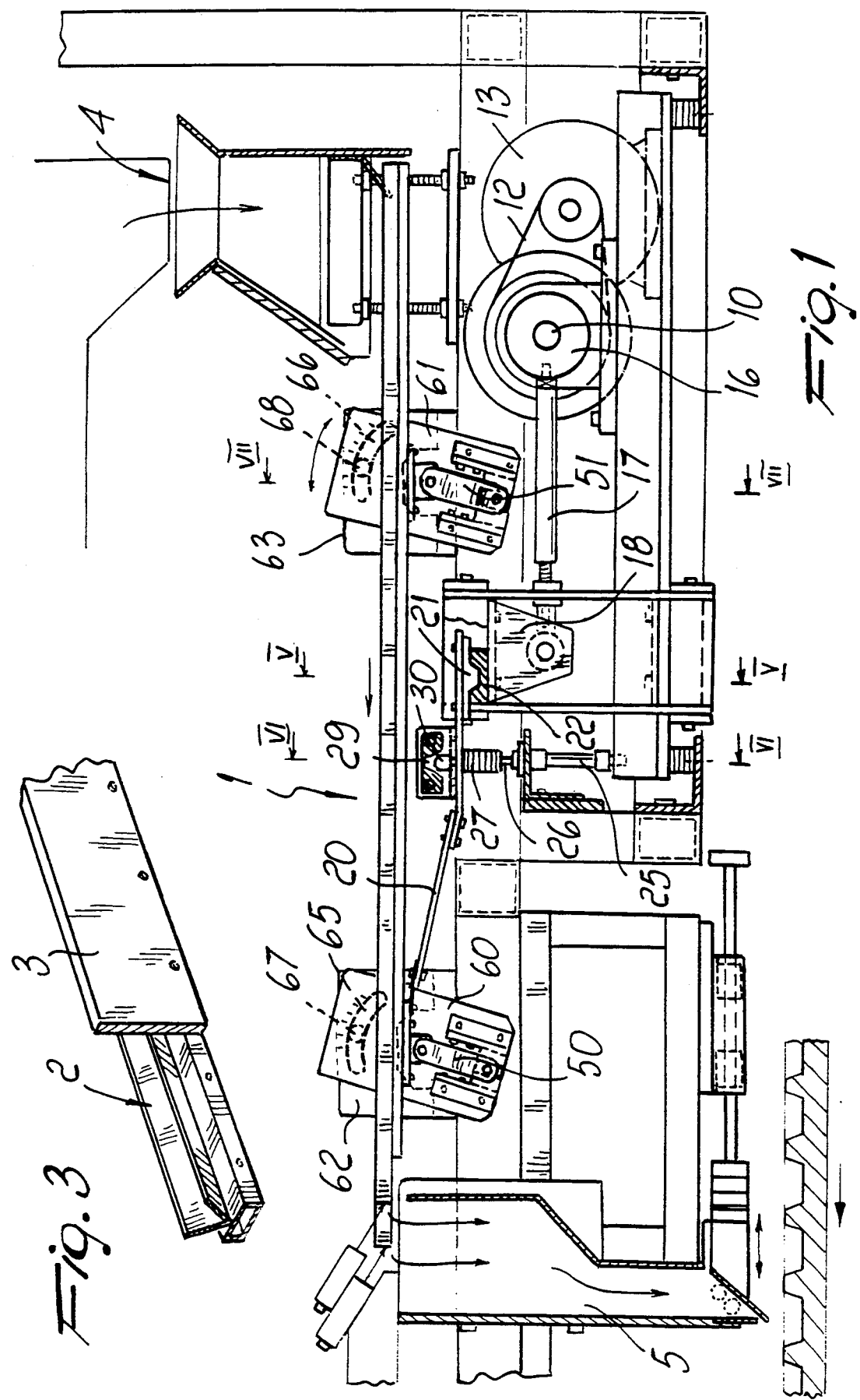

5,353,917

MULTIPLE-CHANNEL VIBRATING FEEDING TABLE

This is a continuation of application Ser. No. 07/911,573 filed Jul. 10, 1992 U.S. Pat. No. 5,190,139.

BACKGROUND OF THE INVENTION

The present invention relates to a vibrating feeding table for feeding loose parts in general.

As is known, vibrating tables are often used in order to feed loose parts, which may be of any type and nature; said tables have the function of conveying the parts, in a controlled manner, from a loading station, where said parts are fed randomly, to an unloading station, where the parts are for example aligned, orientated, selected, counted or in any way controlled.

Currently commercially available vibrating tables substantially have a table which defines, on its upper surface, a plurality of mutually adjacent troughs executed with a configuration and a number which varies in each instance according to the type of part and to the capacity of the vibrating table.

The table is connected to vibration means, generally constituted by electromagnetic systems or by mechanical systems, which impart to the parts which are present on the vibrating table an advancement motion which can be adjusted according to the contingent requirements.

In the solution of the known art, in practice all the troughs are subjected to the same treatment, i.e. they undergo the same type of vibration and accordingly impart a similar type of advancement to the parts. This fact causes difficulties during operation, since the possibility of adjusting the vibration affects all the troughs simultaneously, so that for example in the case of counting it is not possible to easily adjust the input rate of the various parts on the individual channels.

Another problem is furthermore constituted by the fact that, for example if mutually different parts are fed into adjacent troughs and must be mixed in some way, it is not possible to control the feeding of the different types of part.

SUMMARY OF THE INVENTION

The aim of the present invention is indeed to solve the problems described above by providing a vibrating table for feeding loose parts which allows to facilitate all the operations for controlling the movement of the parts in the individual troughs, with the possibility of imparting movement characteristics which differ among troughs.

Within the scope of the above aim, a particular object of the present invention is to provide a vibrating feeding table which allows to diversify the type of movement of the parts in the various sections of the trough according to the different and contingent requirements of operation.

Within the scope of the above aim, a particular object of the present invention is to provide a vibrating table for feeding loose parts which, by virtue of its peculiar characteristics of execution, is capable of giving the greatest assurances of reliability and safety in use.

Not least object of the present invention is to provide a vibrating table for feeding loose parts which can be easily obtained starting from commonly commercially available elements and materials and which is furthermore competitive from a merely economical point of view.

This aim, the objects mentioned and others which will become apparent hereinafter are achieved by a vibrating feeding table, according to the invention, which comprises a table provided with a plurality of mutually flanking troughs which define channels for conveying loose parts, motor means being furthermore provided in order to vibrate said table, characterized in that it comprises means for connecting each of said troughs to said motor means which can be activated individually for the vibratory actuation of only the chosen trough or troughs.

BRIEF DESCRIPTION OF THE DRAWINGS

Further characteristics and advantages will become apparent from the description of a preferred but not exclusive embodiment of a vibrating table for feeding loose parts, illustrated only by way of non-limitative example in the accompanying drawings, wherein:

FIG. 1 is a schematic partially sectional elevation view of the vibrating feeding table according to the invention;

FIG. 3 is a schematic perspective view of a trough;

DESCRIPTION OF THE PREFERRED EMBODIMENTS

Figure 4:
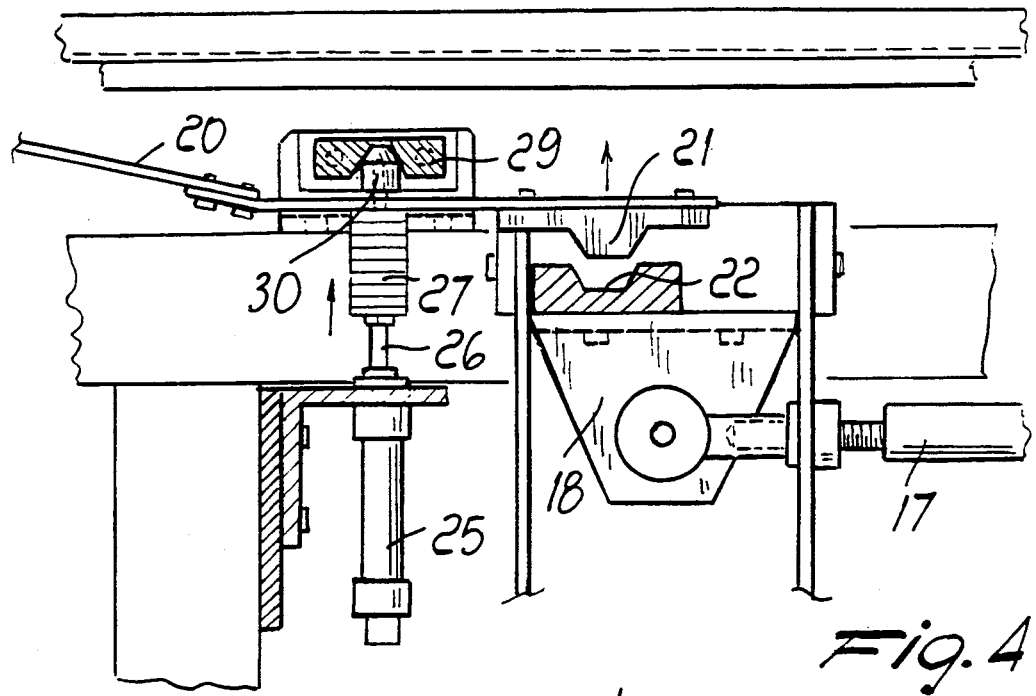
FIG. 4 is a schematic sectional view of the means for connecting the motor means to each trough.
Figure 2:
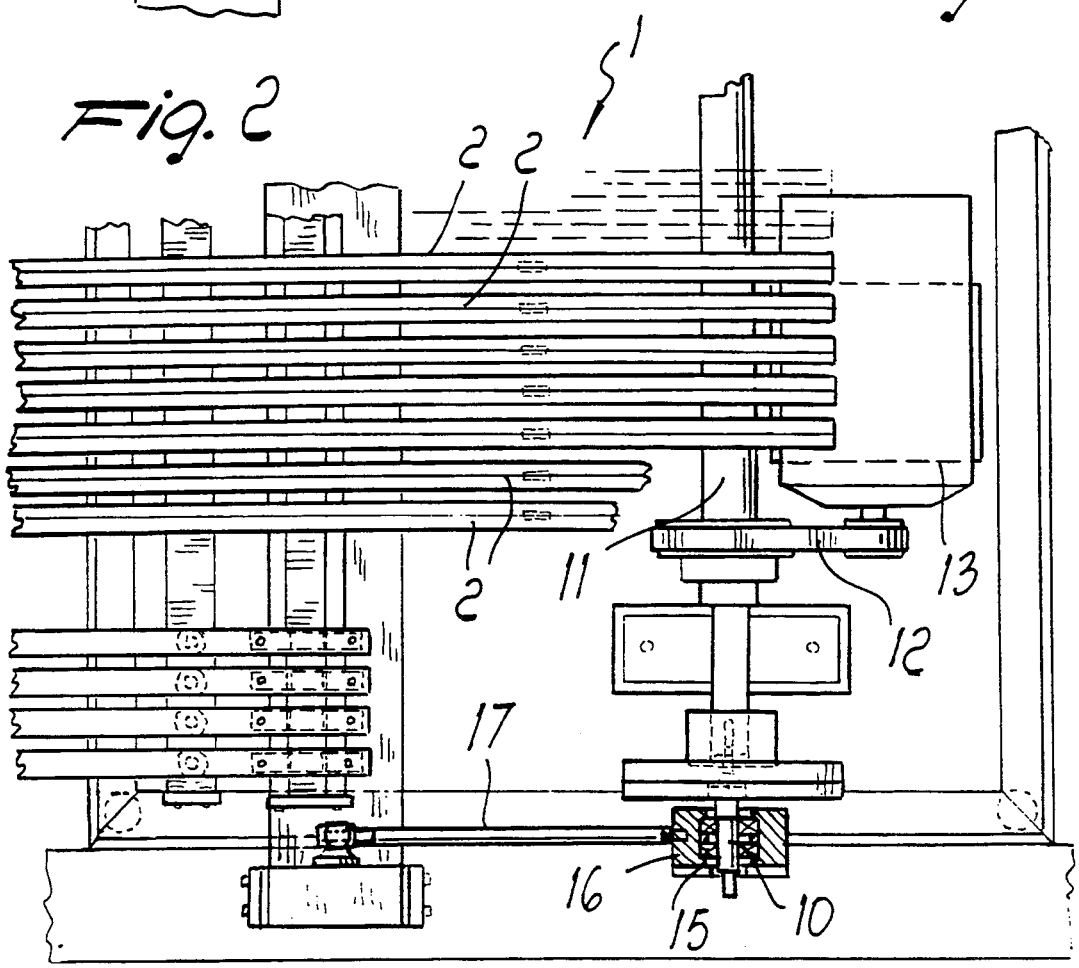
FIG. 2 is a partial plan view of the vibrating feeding table, illustrating the motor means for vibrating said table.
Figures 5, 6, 7:
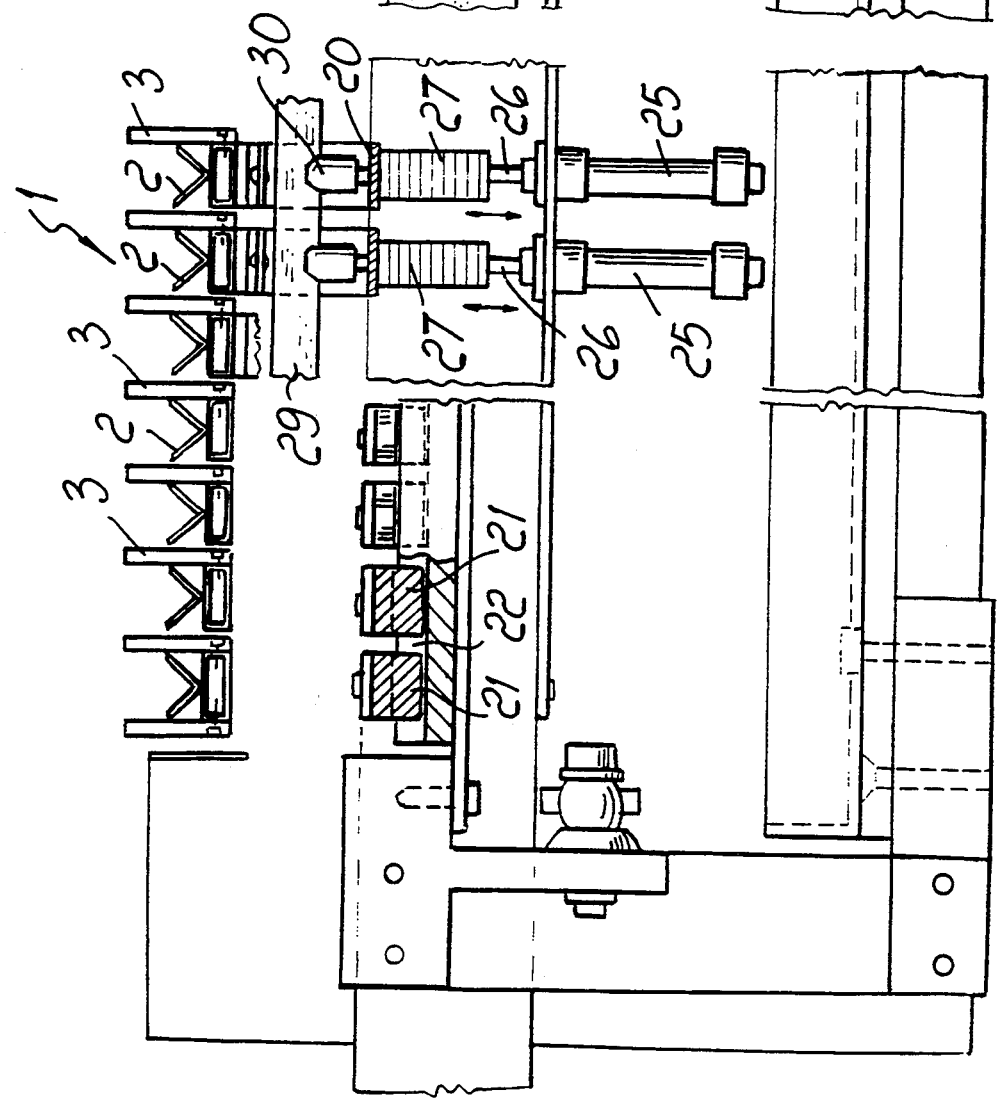
FIG. 5 is a partial sectional view, taken along the plane V—V of FIG. 1.
FIG. 6 is a partial sectional view, taken along the plane VI—VI of FIG. 1.
FIG. 7 is a partial sectional view, taken along the plane VII—VII of FIG. 1.

With reference to the above figures, the vibrating feeding table for feeding loose parts in general comprises a table, generally designated by the reference numeral 1, which comprises a plurality of troughs 2 which are arranged mutually side by side and which extend in a parallel manner.

In the specific non-limitative illustrated embodiment, the troughs 2 are substantially V-shaped and are mutually separated by dividing partitions 3.

The troughs 2 in practice define the channels for conveying the loose parts in general which arrive from a loading station 4, where the parts are fed randomly, and which are transferred to an unloading station, generally designated by the reference numeral 5, where the parts are conveyed in a regulated manner according to the contingent requirements of the user.

The vibrating table is vibrated by virtue of motor means which draw their motion by means of mechanical, electromagnetic or pneumatic systems, and which are constituted, in the illustrated embodiment, by an eccentric element 10 which is connected to a motor shaft 11 which draws its motion from a motor 13 by means of a belt 12.

A roller 16 is associated with the eccentric element 10 with bearings 15 interposed therebetween; a traction element 17 extends radially from said roller and is connected to a mass 18 which vibrates due to the reciprocating motion imparted by the traction element 17 and which extends substantially below each trough transversely to the extension of said troughs.

The peculiarity of the invention is constituted by the fact that the troughs 2 can be vibrated individually independently of one another, i.e. it is possible to vibrate one or more of the troughs according to the contingent requirements, with the possibility of managing and controlling which or how many of the troughs must be vibrated.

Means for connecting the troughs and the vibration-producing motor means are provided for this purpose and comprise flexible tabs 20 which are associated with the lower face of the trough and which end with a shaped slider 21 which can be coupled in a removable manner in a shaped seat 22 defined on the vibrating mass 18.

More specifically, when the shaped slider 21 is coupled to the shaped seat 22, the vibration is transmitted to the related trough, whereas when the shaped slider 21 is disengaged from the shaped seat 22, the trough is not vibrated.

Actuation means are provided for actuating the flexible tabs 20 in order to move the slider 21 so that it engages with, or disengages from, the seat 22; said actuation means comprise cylinders 25 whose stems 26, with the interposition of elastic buffers 27, engage a median portion of the tab 20 with the possibility of lifting it, with reference to the drawing, consequently disengaging the slider 21 from the shaped seat or engaging the slider 21 with the shaped seat 22, when the stem 26 is in its lower position. The cylinders are selectively actuated by known means such as hydraulic circuits.

Advantageously, there is a locking saddle 29 in which a protrusion 30 of the elastic tab 20 can be inserted, with the slider 21 in disengagement position.

The execution of the individual troughs so that they can be individually vibrated allows to achieve considerable operating advantages, since it allows to manage the individual troughs according to the contingent requirements, actuating them so that the parts arrive at the unloading station in the required number and type.

Thus, for example if it is necessary, for any reason, to obtain a packaging of different parts in a single set at the outlet, it is possible to convey the different parts on different troughs, actuating the individual troughs until the required ratios between the different parts are achieved.

Furthermore, the possibility of actuating the individual troughs makes counting considerably simpler, since for example during the final counting steps it is possible to actuate one trough, or in any case a limited number of troughs, so as to have the certainty of obtaining the exact count number.

To the above it should be furthermore added that the provision of separate troughs allows a wide versatility in use which cannot be achieved with the solutions of the known art, wherein all the troughs of a same vibrating table are subjected to the same type of movement.

Another important aspect of the present invention is furthermore constituted by the fact that the individual troughs are supported, proximate to their ends, respectively by the upper ends of front and rear connecting rods 50 and 51 which are pivoted at the lower part of the trough and which are associated with a fixed structure of the table at their lower ends.

The trough in practice vibrates by oscillating on said connecting rods.

It is possible to vary the inclination of the front and rear connecting rods, consequently varying the type of movement imparted by said connecting rods to the troughs, for example to accelerate or decelerate the movement of the parts, consequently moving the individual parts further apart or closer to one another, so as to manage the advancement of the parts according to one's own processing requirements.

In order to vary the position of the connecting rods, said connecting rods 50 and 51 are articulated, at their lower ends, respectively with a front plate 60 and with a rear plate 61 which are pivoted at the upper pivoting point of the connecting rods to the trough and which can be rotated by varying the position of the lower pivoting ends, consequently varying the useful inclination between the trough and connecting rod.

The plates 60 and 61 engage respective fixed plates 62 and 63, each of which has a slot 65 and 66 which is shaped like a portion of a circumference and in which a securing bolt 67 and 68 is engaged which allows to set the angle considered to be optimum.

From what has been described above it can thus be seen that the invention achieves the intended aim and objects, and in particular the fact is stressed that the provision of a vibrating table wherein the individual troughs can be actuated independently of one another allows to manage the operation of the vibrating table at will, by acting on the actuation of the individual troughs, which can feed identical or different parts to allow any kind of movement.

Another important aspect is furthermore constituted by the fact that the troughs are supported, in order to be vibrated, by a pair of connecting rods whose inclination can be adjusted independently between the front connecting rods and the rear connecting rods, so as to vary the type of vibration, thus allowing to diversify the movement imparted to the parts.

The invention thus conceived is susceptible to numerous modifications and variations, all of which are within the scope of the inventive concept.

All the details may furthermore be replaced with other technically equivalent elements.

Thus, for example, the connecting rods might be replaced with inclined guiding planes which transmit the required movement to the individual troughs.

In practice, the materials employed, as well as the contingent shapes and dimensions, may be any according to the requirements.

I claim:

1. Multiple-channel vibrating feeding table comprising: a table provided with a plurality of mutually adjacent troughs which define channels for conveying loose parts in general, motor means including a single motor for vibrating said table, and means for connecting each of said troughs to said motor means which can be activated individually for the vibratory actuation of only selected trough or troughs.

2. Vibrating feeding table according to claim 1, wherein said motor means further comprise an eccentric element which is connected to a motor shaft which draws its motion from said single motor, a roller being associated with said eccentric element, a traction element extending radially from said roller and being connected to a vibrating mass with which said connection means interact.

3. Vibrating feeding table according to claim 2, wherein said connection means comprise flexible tabs which are associated at the lower face of each trough and end with a shaped slider which can be associated in a removable manner in a shaped seat defined on said vibrating mass.

4. Vibrating feeding table according to claim 3, further comprising actuation means for actuating said flexible tabs in order to engage said slider with, or disengage said slider from, said second shaped seat, said actuation means comprising cylinders whose stem, with the interposition of buffers which can be deformed in any manner, engages a median portion of each of said tabs in order to engage said slider with said shaped seat or disengage it therefrom.

5. Vibrating feeding table according to claim 4, further comprising a locking saddle or friction systems in which a protrusion of each of said elastic tabs can be inserted in a removable manner, with said tab in raised position and with said slider disengaged from said shaped seat.

6. Vibrating feeding table according to claim 1, further comprising front connecting rods and rear connecting rods which are pivoted to the lower part of each trough and are associated with a fixed structure at their lower ends, means for varying the inclination of the front connecting rods and means for varying the inclination of the rear connecting rods being furthermore provided.

7. Vibrating feeding table according to claim 6, wherein said inclination varying means are respectively constituted by a front pate and by a rear plate which are pivoted in the upper pivoting point of the connecting rods to said troughs, said front and rear plates being able to rotate in order to vary the position of the lower pivoting ends of said connecting rods.

8. Vibrating feeding table according to claim 7, further comprising means for mutually locking said plates with respect to fixed plates which have slots shaped like a portion of a circumference, in which locking means, constituted by securing bolts, engage.

* * * * *